United States Patent
Merriman et al.

(10) Patent No.: US 6,614,326 B2
(45) Date of Patent: Sep. 2, 2003

(54) POWER-LINE COUPLER HAVING A CIRCUIT BREAKER FORM OR A PANELBOARD EMPLOYING THE SAME

(75) Inventors: Allan R. Merriman, New Brighton, PA (US); James Dolfi, Cranberry Township, PA (US); Fred Shahdadian, Cannonsburg, PA (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/902,452

(22) Filed: Jul. 10, 2001

(65) Prior Publication Data

US 2003/0011441 A1 Jan. 16, 2003

(51) Int. Cl.[7] ................................................. H01P 5/12
(52) U.S. Cl. ........................................ 333/100; 333/131
(58) Field of Search ................................ 333/100, 101, 333/109, 124, 131; 340/310.01, 310.08, 310.07

(56) References Cited

U.S. PATENT DOCUMENTS

| | | | |
|---|---|---|---|
| 4,038,601 A | * | 7/1977 | Laborie et al. ............. 333/131 |
| 4,446,503 A | | 5/1984 | Link et al. |
| 5,206,777 A | | 4/1993 | Clarey et al. |
| 5,453,723 A | | 9/1995 | Fello et al. |
| 5,483,211 A | | 1/1996 | Carrodus et al. |
| 5,491,463 A | | 2/1996 | Sargeant et al. |
| 5,694,108 A | * | 12/1997 | Shuey .................... 340/310.01 |
| 5,912,605 A | | 6/1999 | Eberts |
| 5,949,300 A | * | 9/1999 | Olsson ....................... 333/100 |
| 5,949,779 A | | 9/1999 | Mostafa et al. |
| 5,994,892 A | * | 11/1999 | Turino et al. ................ 324/142 |
| 6,452,482 B1 | * | 9/2002 | Cern ..................... 340/310.01 |

OTHER PUBLICATIONS

Advanced Control Technologies, Inc., *"Quick Reference" Specifications Control Interfaces,* Aug. 13, 1999, 2 pp.
Advanced Control Technologies, Inc., *New CEBus "Problem Solvers",* Aug. 13, 1999, 2 pp.
Advanced Control Technologies, Inc., *Advanced Control Technologies Complete Line of Products for Industrial and Home Applications,* 1 p.

* cited by examiner

Primary Examiner—Robert Pascal
Assistant Examiner—Dean Takaoka
(74) Attorney, Agent, or Firm—Martin J. Moran

(57) ABSTRACT

A CEBus coupler for a pair of power-lines includes a housing in the form of a miniature two-pole circuit breaker. A wire pigtail electrically connects to a neutral power-line. First and second circuit breaker stabs are disposed on the housing. An inductively coupled circuit couples a CEBus power-line carrier signal, as referenced to the neutral power-line, between one of the first and second circuit breaker stabs, and the other of the first and second circuit breaker stabs.

2 Claims, 5 Drawing Sheets

POWER-LINE COUPLER HAVING A CIRCUIT BREAKER FORM OR A PANELBOARD EMPLOYING THE SAME

BACKGROUND OF THE INVENTION

1. Field of the Invention

This invention pertains generally to power-line carrier communication and, more particularly, to couplers for providing power-line carrier communication between two or more power-lines. The invention also relates to a panelboard employing a coupler for providing power-line carrier communication between two or more power-lines.

2. Background Information

An electrical distribution system within an industrial, commercial or residential property starts at the utility service entrance and ends at the final utilization equipment or loads. The service entrance includes the utility company's watt-meter or kWh meter. Beyond the utility company's meter is a main circuit interrupting device, such as a circuit breaker. The main circuit breaker supplies power to a number of feeder circuits which, in turn, power a number of branch circuits. In a small system, such as a home, the main circuits directly feed individual branch circuits and no feeder circuits are employed. The electrical utilization loads are normally located on the branch circuits.

It is known to employ serial communication on power-lines based upon standard open protocols, such as asynchronous power-line carrier CEBus and X10. See, for example, U.S. Pat. Nos. 5,949,779 (CEBus); and 5,491,463 (X-10).

A CEBus master, for example, may be interconnected with and powered through one or both lines of a conventional two-line residential power system, or one, two or three lines of a three-phase industrial power system. The CEBus master may employ a communication medium, such as a wide area network, between a CEBus power-line carrier local area network and, for example, a utility company at a remote location. The communication medium may be any of various systems such as, for example, telephone, fiber optic, cable television or radio frequency (RF). The CEBus power-line carrier local area network provides communication between the CEBus master and one or more CEBus slaves on that network.

It is known to employ a CEBus passive coupler to transfer CEBus command signals generated on one phase of a plural-phase power system to another of those phases. In this manner, all CEBus products on one of the phases may communicate with other CEBus products on the other phase(s). Discrete wires are employed to connect the CEBus passive coupler between the phases of power and to the neutral power-line. Alternatively, rather than directly connecting the wires to the phase conductors, the wires may be connected to the load side of the phase circuit breakers.

Although CEBus passive couplers expand the scope of CEBus communication, there is room for improvement.

SUMMARY OF THE INVENTION

The present invention provides improvements in the mechanical packaging of couplers for power-line carrier signals.

In accordance with one aspect of the invention, a coupler for a pair of power-lines comprises: a housing having a form of a circuit breaker; means for electrically connecting to a neutral power-line; a first circuit breaker stab disposed on the housing; a second circuit breaker stab disposed on the housing; and means for coupling a power-line carrier signal as referenced to the neutral power-line between one of the first and second circuit breaker stabs, and the other of the first and second circuit breaker stabs.

As another aspect of the invention, a coupler for three power-lines comprises: a housing having a form of a circuit breaker; means for electrically connecting to a neutral power-line; a first circuit breaker stab disposed on the housing; a second circuit breaker stab disposed on the housing; a third circuit breaker stab disposed on the housing; means for coupling a power-line carrier signal as referenced to the neutral power-line between the first circuit breaker stab and the second circuit breaker stab; and means for coupling the power-line carrier signal between one of the first and second circuit breaker stabs, and the third circuit breaker stab.

As a still further aspect of the invention, a panelboard apparatus is for use with a plurality of electrical switching apparatus which switch a plurality of circuits from a plurality of power-lines through a plurality of loads. The panelboard apparatus comprises an enclosure; at least one electrical switching apparatus, with the enclosure for holding up to the plurality of electrical switching apparatus including the at least one electrical switching apparatus; and a coupler for at least a pair of the power-lines. The coupler comprises a housing having a form of a circuit breaker; means for electrically connecting to a neutral power-line; a first circuit breaker stab disposed on the housing for engaging one of the pair of the power-lines; at least a second circuit breaker stab disposed on the housing for engaging another of the pair of the power-lines; and means for coupling a power-line carrier signal as referenced to the neutral power-line between one of the first and second circuit breaker stabs for a first power-line of the pair of the power-lines, and the other of the first and second circuit breaker stabs for a second power-line of the pair of the power-lines.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
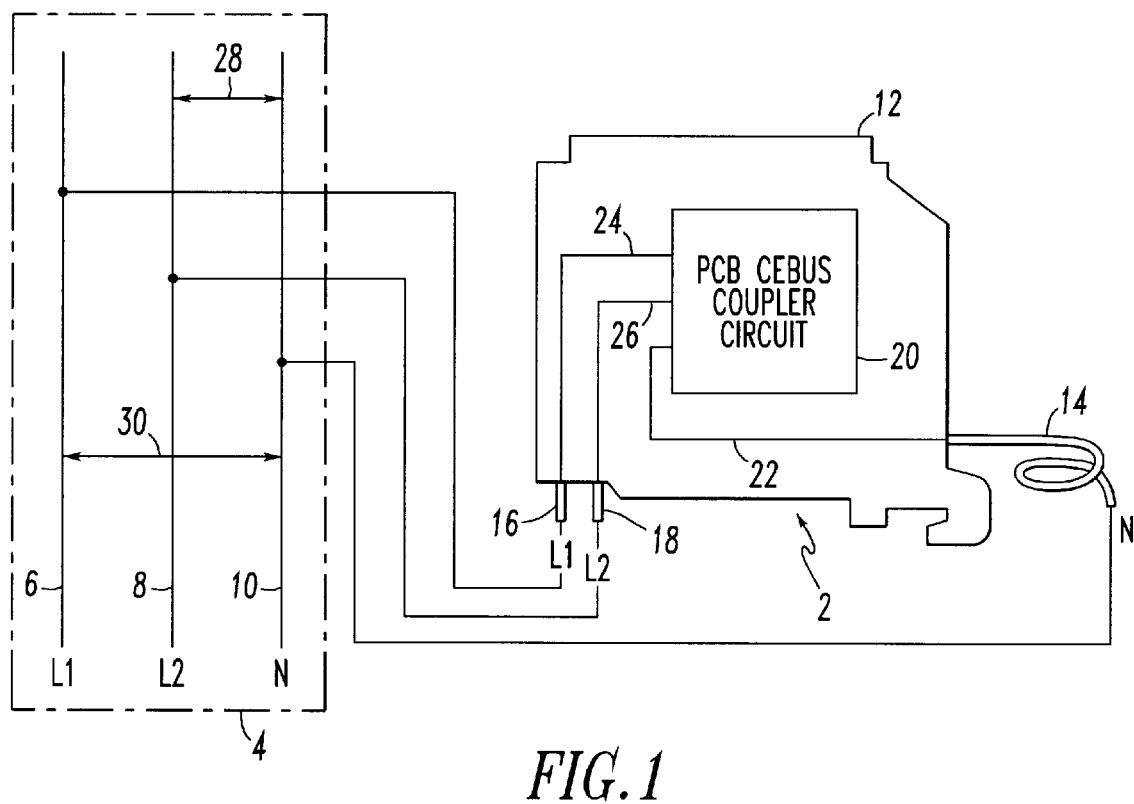
FIG. 1 is a block diagram of a CEBus coupler in the form of a two-pole miniature circuit breaker in accordance with the invention.

Referring to FIG. 1, a two-line, single-phase CEBus coupler 2 is shown. The exemplary CEBus coupler 2 is employed with a power system 4 having a pair of power-lines 6,8 and a neutral power-line 10. The coupler 2 includes a housing 12 having a form of a circuit breaker, which in the exemplary embodiment is a two-pole miniature circuit breaker, although a wide range of circuit breaker forms may be employed. The coupler 2 also includes an exemplary wire pigtail 14 for electrical connection to the neutral power-line (N) 10, a first circuit breaker stab 16 disposed on the housing 12 for electrical connection to the first power-line (L1) 6, and a second circuit breaker stab 18 disposed on the housing 12 for electrical connection to the second power-line (L2) 8.

Figure 8:
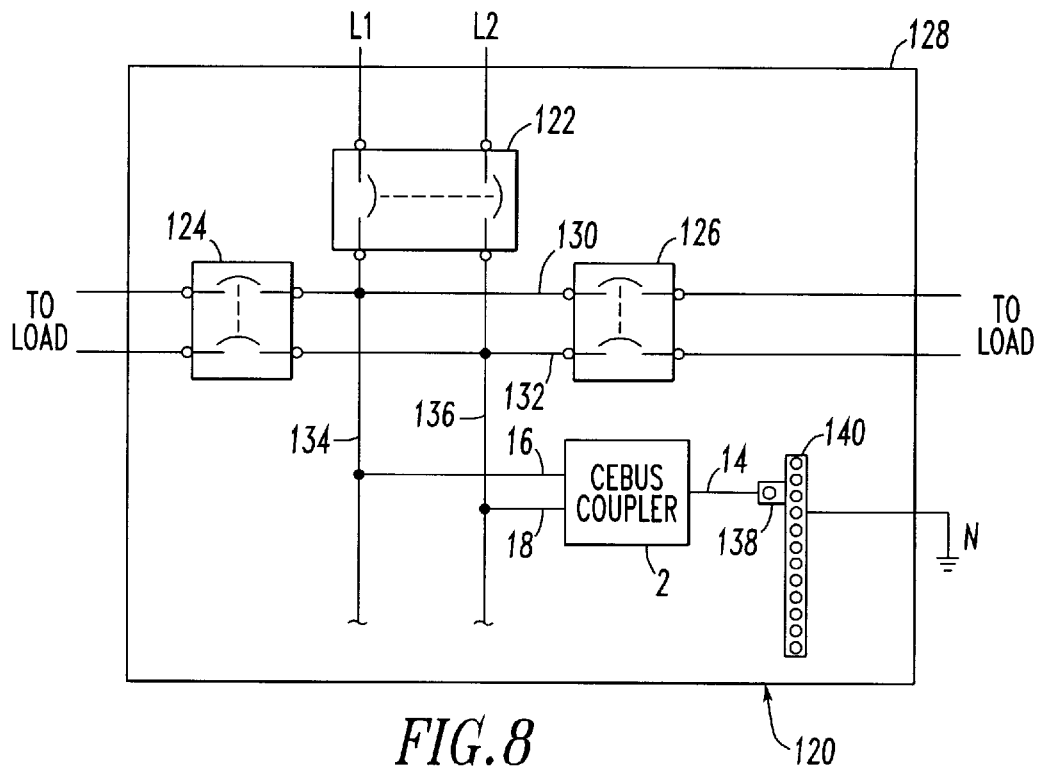
FIG. 8 is a block diagram of a panelboard having a plurality of circuit breakers and the CEBus coupler of FIG. 1.

Preferably, the line stabs 16,18 project through the bottom of the housing 12 for electrical connection to the corresponding line conductors or power busses 134,136 in a distribution panel, such as the panelboard 120 of FIG. 8.

The pigtail 14, first stab 16 and second stab 18 are, in turn, suitably electrically connected to a CEBus coupler circuit 20 by electrical connections, such as conductors or wires 22 (which may be part of, or an extension of, the pigtail 14), 24 and 26, respectively. In the exemplary embodiment, the circuit 20 is disposed on a printed circuit board (PCB) and functions to couple a power-line carrier signal 28, as referenced to the neutral power-line 10, between the second circuit breaker stab 18 and the first circuit breaker stab 16. Preferably, the circuit 20 also functions to couple a power-line carrier signal 30, as referenced to the neutral power-line 10, between the first circuit breaker stab 16 and the second circuit breaker stab 18. Alternatively, the conductors or wires 24 and 26 may be replaced by electrical PCB traces of the PCB, with the stabs 16,18 being directly electrically connected (e.g., by soldering) to such traces. A wide range of suitable electrical connections may, thus, be employed. The exemplary PCB CEBus coupler circuit 20 accommodates any style circuit breaker housing (e.g., a standard ¾" wide breaker, a 1" wide breaker). In this manner, the exemplary CEBus coupler 2 may be employed in a variety of old and new installations.

Figure 2:
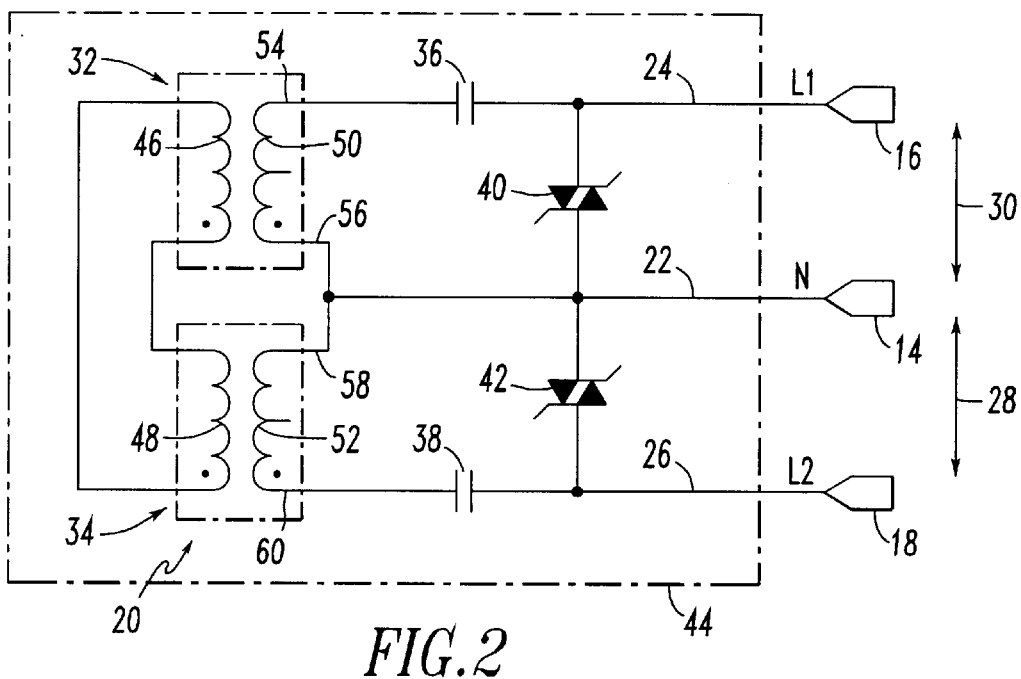
FIG. 2 is a schematic diagram of the CEBus coupler of FIG. 1.

FIG. 2 shows a schematic diagram of the CEBus coupler circuit 20 of FIG. 1. The exemplary circuit 20 includes two transformers 32,34, two capacitors 36,38, and two varistors 40,42 (e.g., metal oxide varistors (MOVs)). The circuit 20 is preferably disposed on a PCB 44. The first varistor 40 is electrically connected by the exemplary conductors 22,24 between the first circuit breaker stab 16 and the wire pigtail 14 which is, in turn, electrically connected to the neutral power-line (N) 10 of FIG. 1. In a similar manner, the second varistor 42 is electrically connected by the exemplary conductors 22,26 between the second circuit breaker stab 18 and the wire pigtail 14.

The transformers 32,34 have primary windings 46,48 and secondary windings 50,52, respectively, although those particular winding designations are for purpose of illustration, but not limitation. The exemplary primary windings 46,48 are electrically connected in parallel. The exemplary secondary windings 50 and 52 have two ends 54,56 and 58,60, respectively. Although the exemplary embodiment shows the secondary windings 50,52 with a center tap, that particular configuration is not required.

The capacitor 36 is electrically interconnected between the first circuit breaker stab (L1) 16 and the end 54 of the secondary winding 50 of the transformer 32. Similarly, the capacitor 38 is electrically interconnected between the second circuit breaker stab (L2) 18 and the end 60 of the secondary winding 52 of the transformer 34. The exemplary wire pigtail 14 is electrically connected through the exemplary conductor 22 to the ends 56,58 of the secondary windings 50,52 of the respective transformers 32,34.

The exemplary CEBus coupler circuit 20 functions to passively couple the CEBus power-line carrier signal 30 on the first circuit breaker stab (L1) 16, as referenced to the wire pigtail 14, to the second circuit breaker stab (L2) 18, as also referenced to the wire pigtail 14. Alternatively, the circuit 20 functions to passively couple the CEBus power-line carrier signal 28 on the second circuit breaker stab (L2) 18, as referenced to the wire pigtail 14, to the first circuit breaker stab (L1) 16, as also referenced to the wire pigtail 14.

Preferably, the CEBus power-line carrier signals 28,30 have a carrier frequency, and the circuit 20, including the capacitors 36,38 and the transformers 32,34, is tuned to that carrier frequency, in order to inductively couple the CEBus power-line carrier signals 28,30 between the circuit breaker stabs 16,18, as referenced to the wire pigtail 14. The exemplary coupling ratio from one power-line to another power-line is 1:1 for an exemplary 120 VAC/277 VAC power system. The capacitors 36,38 are electrically connected to the signal carrying power-line conductors 6,8 through the stabs 16,18 on the exemplary two-pole circuit breaker housing 12 of FIG. 1.

Figure 3:
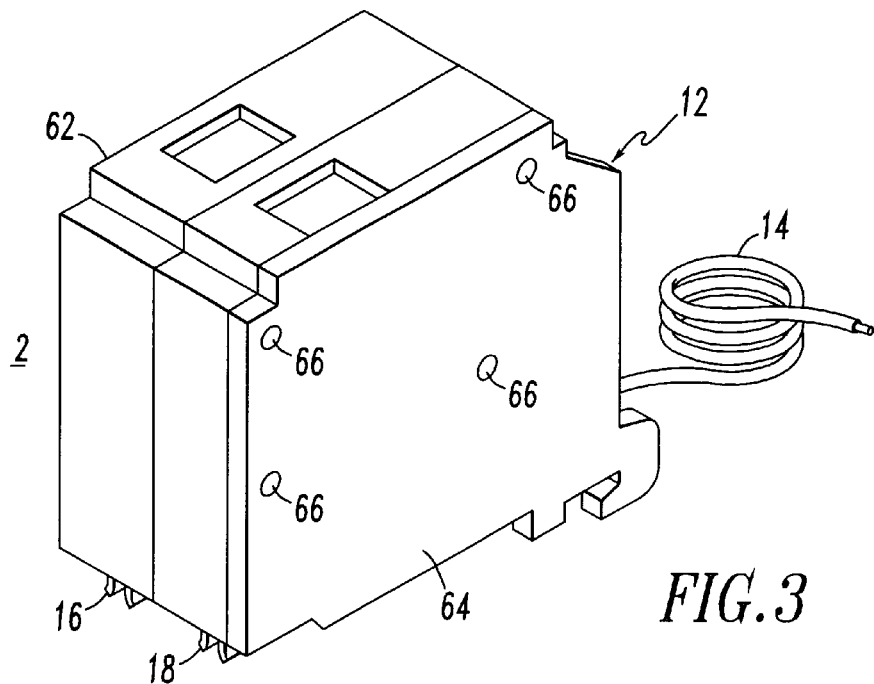
FIG. 3 is an isometric view of the CEBus coupler of FIG. 1.
Figure 4:
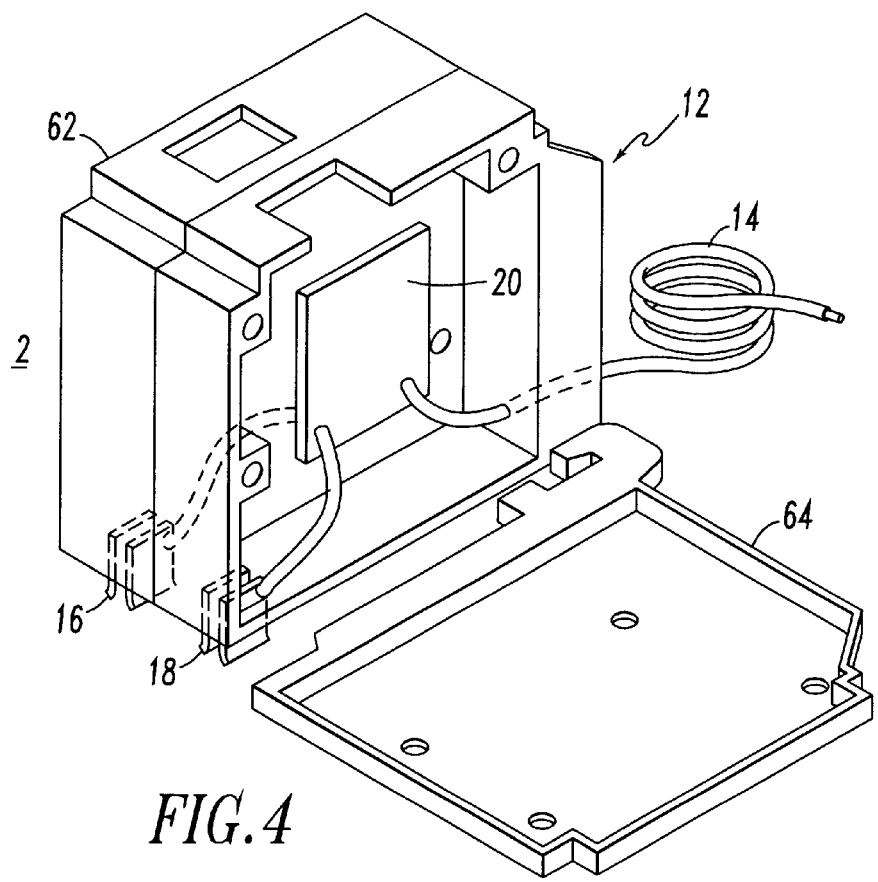
FIG. 4 is an isometric view of the CEBus coupler of FIG. 1 in which a cover portion of the housing is removed.

Referring to FIGS. 3 and 4, isometric views of the CEBus coupler 2 of FIG. 1 are shown. The housing 12 for holding the internal PCB circuit 20 has a base portion 62 and a cover portion 64 which is suitably secured thereto by fasteners 66.

Figure 5:
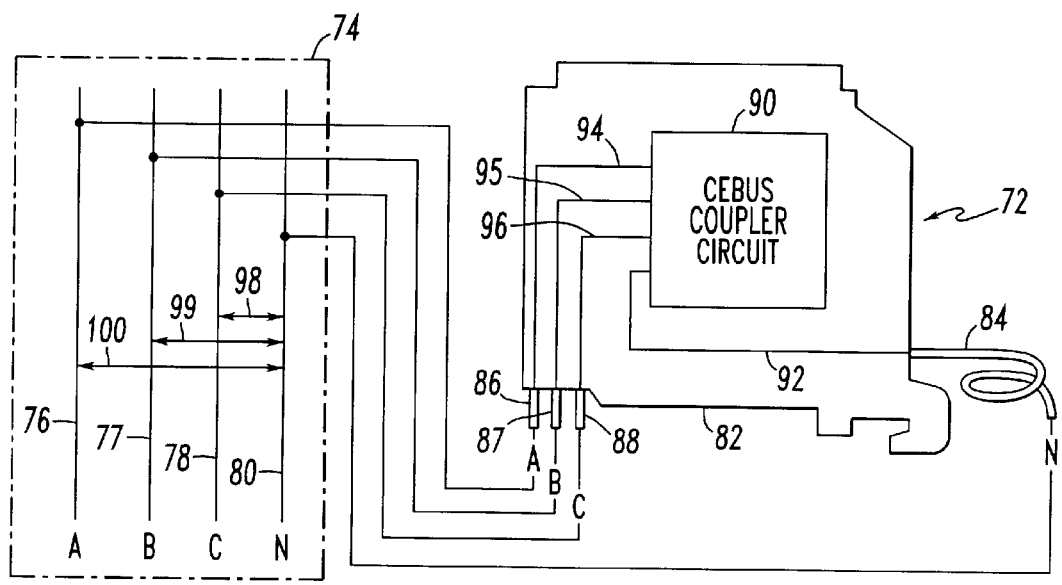
FIG. 5 is a block diagram of a CEBus coupler in the form of a three-phase circuit breaker in accordance with another embodiment of the invention.

FIG. 5 shows a three-phase CEBus coupler 72 in the form of an exemplary three-pole (three-phase) miniature circuit breaker. The exemplary CEBus coupler 72 is employed with a power system 74 having three power-lines 76,77,78 (A,B, C) and a neutral power-line 80 (N). The coupler 72 includes a housing 82 having a form of a circuit breaker, which in the exemplary embodiment is a three-pole miniature circuit breaker, although a wide range of circuit breaker forms may be employed. The coupler 72 also includes an exemplary wire pigtail 84 for electrical connection to the neutral power-line 80. The coupler 72 further includes three circuit breaker stabs 86,87,88 disposed on the housing 72 for electrical connection to the power-lines 76,77,78, respectively.

Figure 9:
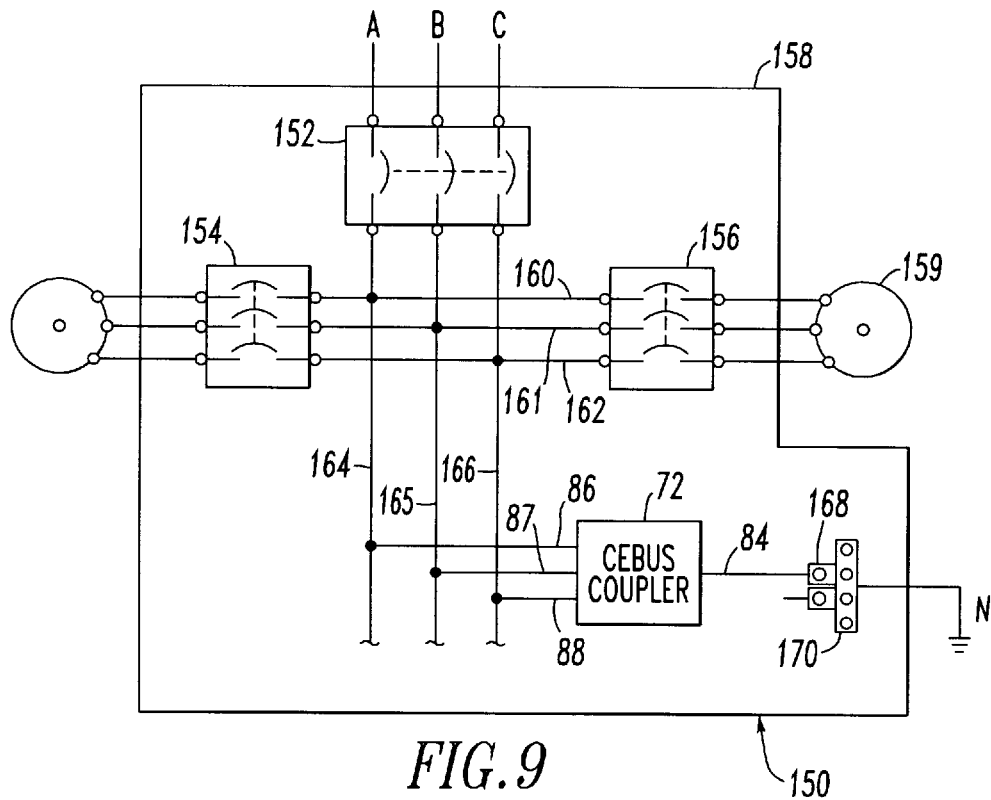
FIG. 9 is a block diagram of a panelboard having a plurality of circuit breakers and the CEBus coupler of FIG. 5.

Preferably, the line stabs 86,87,88 project through the bottom of the housing 82 for electrical connection to the corresponding line conductors 164,165,166 in a distribution panel, such as the panelboard 150 of FIG. 9. The exemplary CEBus coupler 72 accommodates a wide range of circuit breaker styles and may, thus, be employed in a variety of old and new installations.

The pigtail 84 and stabs 86,87,88 are, in turn, suitably electrically connected to a CEBus coupler circuit 90 by electrical connections, such as wire 92 (which may be part of, or an extension of, the pigtail 84) and conductors, such as wires 94,95,96, respectively, although PCB traces may be employed. In the exemplary embodiment, the circuit 90 is disposed on two printed circuit boards (PCBs) and functions, for example, to couple a power-line carrier signal 98, as referenced to the neutral power-line 80, between the third circuit breaker stab 88 and the second circuit breaker stab 87, and to couple a power-line carrier signal 99, as also referenced to the neutral power-line 80, between the second circuit breaker stab 87 and the first circuit breaker stab 86. Preferably, the circuit 90 also functions to couple the power-line carrier signal 99, as referenced to the neutral power-line 80, between the second circuit breaker stab 87 and the third circuit breaker stab 88, and to couple a power-line carrier signal 100, as referenced to the neutral power-line 80, between the first circuit breaker stab 86 and the second circuit breaker stab 87.

Alternatively, the wires 94,95,96 may be replaced by other conductors, such as electrical PCB traces of one or two PCBs, with the stabs 86,87,88 being directly electrically connected (e.g., by soldering) to such traces. A wide range of suitable electrical connections may, thus, be employed.

Figure 6:
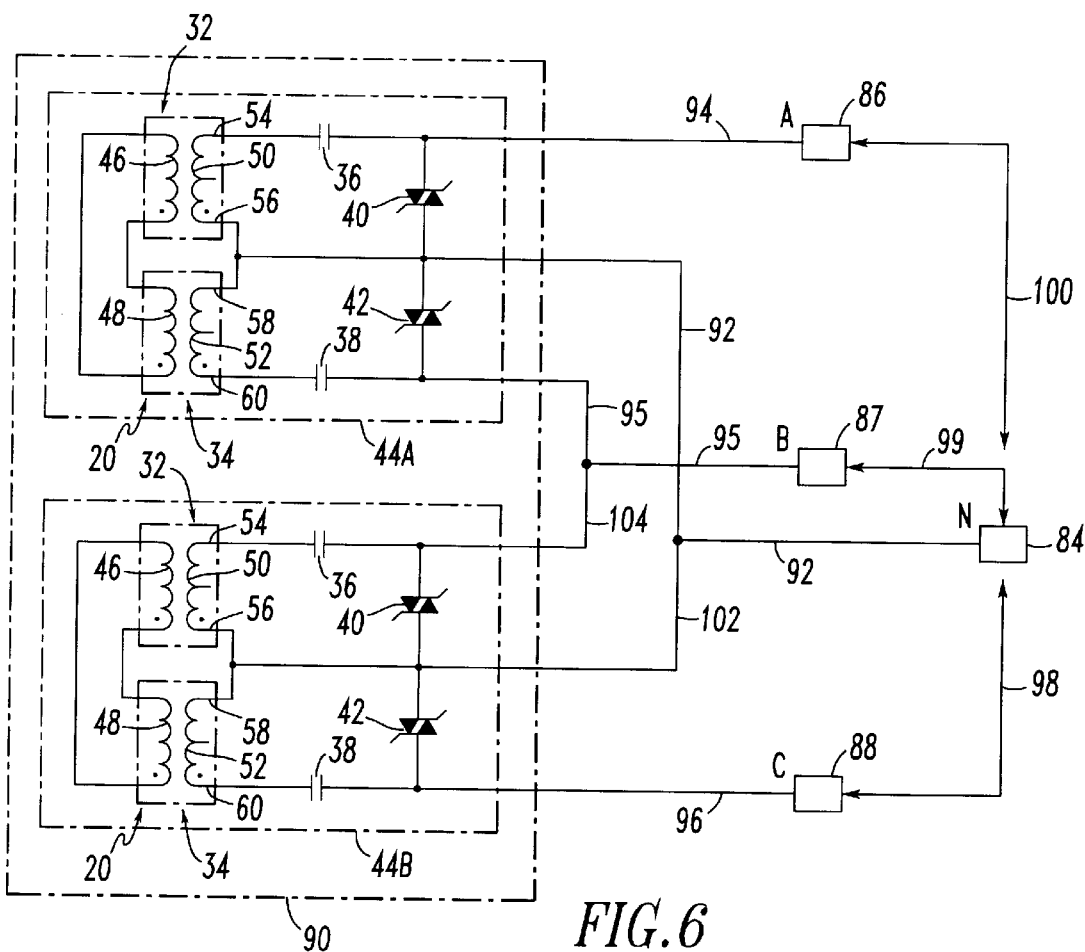
FIG. 6 is a schematic diagram of the CEBus coupler of FIG. 5.

FIG. 6 shows a schematic diagram of the CEBus coupler circuit 90 of FIG. 5. The exemplary circuit 90 includes two PCBs 44A,44B, each of which is the same as the PCB 44 of FIG. 2, although other circuit implementations such as a single printed circuit board may be employed. The PCB 44A is suitably electrically connected to the pigtail 84 and the stabs 86,87 by conductors, such as the exemplary wires 92 and 94,95, respectively. Similarly, the PCB 44B is suitably electrically connected to the pigtail 84 and the stabs 87,88 by conductors, such as the exemplary wires 92/102 and 95/104, 96, respectively.

In this manner, the PCB 44A functions to couple the power-line carrier signal 99, as referenced to the neutral power-line 80 of FIG. 5, between the stab 87 and the stab 86, and to couple the power-line carrier signal 100, as also referenced to the neutral power-line 80, between the stab 86 and the stab 87. The PCB 44B similarly functions to couple the power-line carrier signal 99, as referenced to the neutral power-line 80, between the stab 87 and the stab 88, and to couple the power-line carrier signal 98, as also referenced to the neutral power-line 80, between the stab 88 and the stab 87. Hence, regardless which one of the signals 98,99,100 is originally provided, the PCBs 44A,44B cooperate to couple that signal from one of the three phases (A,B,C) to the other two phases of the power system 74 of FIG. 5.

Figure 7:
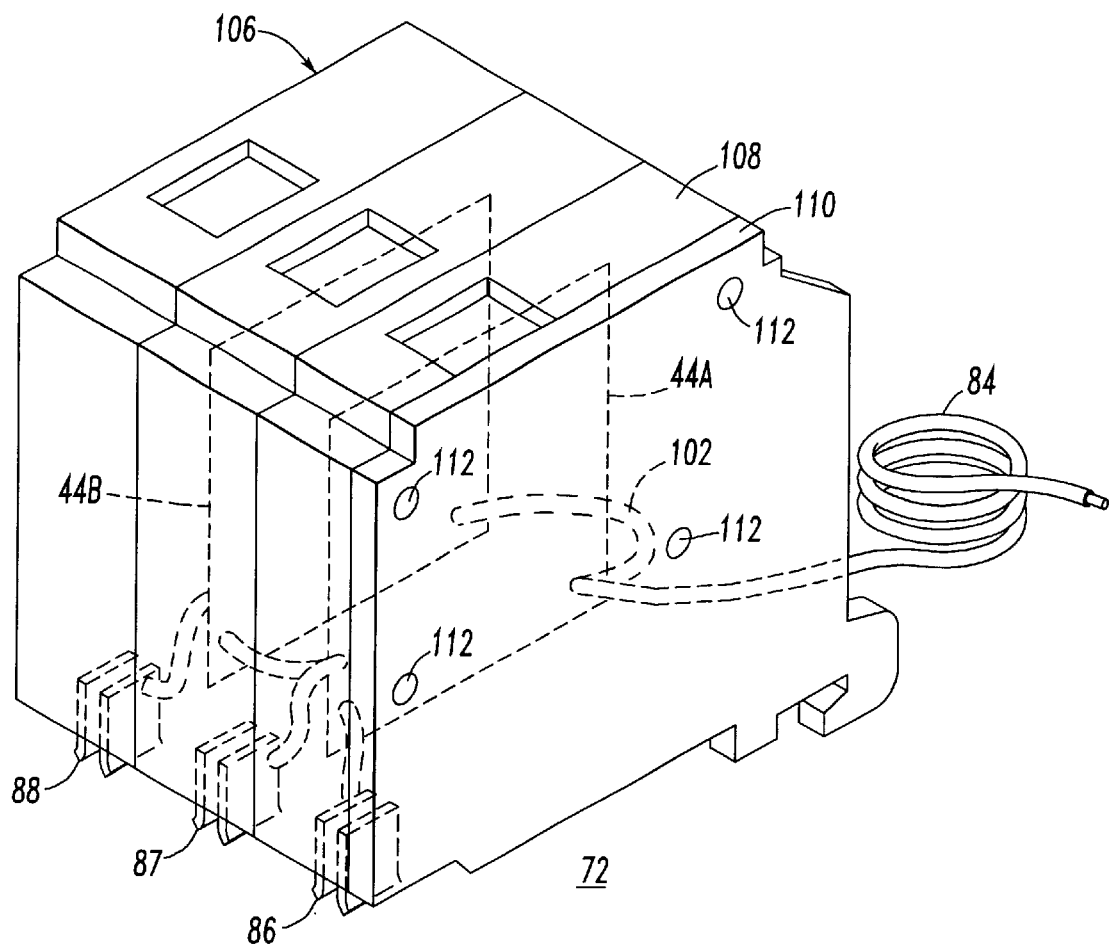
FIG. 7 is an isometric view of the CEBus coupler of FIG. 5.

FIG. 7 is an isometric view of the CEBus coupler 72 of FIG. 5. The coupler 72 includes a housing 106 for the PCBs 44A,44B (shown in hidden line drawing). The housing 106 has a base portion 108, which holds the parallel PCBs 44A,44B, and a cover portion 110 which is suitably secured thereto by fasteners 112.

FIG. 8 is a block diagram of a panelboard 120 having one or more circuit breakers, such as circuit breakers 122,124, 126, the CEBus coupler 2 of FIG. 1, and an enclosure 128. Examples of two-line and three-phase panelboards are disclosed in U.S. Pat. No. 5,206,777 which is incorporated by reference herein. The exemplary coupler 2 has the same form as the exemplary miniature two-pole circuit breakers 124,126. As shown with the circuit breaker 126, the stabs 130,132 thereof engage the internal power busses 134,136, respectively, of the panelboard 120. Similarly, the stabs 16,18 of the CEBus coupler 2 engage those respective power busses 134,136. The pigtail 14 of the coupler 2 is suitably electrically connected by a fastener 138 to a neutral bus 140.

The exemplary panelboard 120 may also include one or more one-pole circuit breakers (not shown). Although a panelboard is shown, any equivalent disconnect unit (e.g., load center, motor control center) may be employed for interrupting electrical power between a power source and one or more loads.

FIG. 9 is a block diagram of a panelboard 150 having one or more circuit breakers, such as circuit breakers 152,154, 156, the CEBus coupler 72 of FIG. 5, and an enclosure 158. The panelboard 150 powers one or more three-phase loads, such as 159. The exemplary coupler 72 has the same form as the exemplary three-pole (three-phase) circuit breakers 154,156. As shown with the circuit breaker 156, the stabs 160,161,162 thereof engage the internal power busses 164, 165,166, respectively, of the panelboard 150. Similarly, the stabs 86,87,88 of the CEBus coupler 72 engage those respective power busses 164,165,166. The pigtail 84 of the coupler 72 is suitably electrically connected by a fastener 168 to a neutral bus 170.

The exemplary CEBus passive couplers 2,72 disclosed herein include respective housings 12,82 having a form of a circuit breaker. These forms simplify the installation of a coupler which supports the exemplary CEBus protocol. With the exemplary CEBus coupler 2, both power-lines of a home load center may readily be tied together, for purpose of CEBus communication, at the source of power, thereby allowing any CEBus related equipment (e.g., switches, power manager, energy control center) to operate anywhere in the local power system. Similarly, with the exemplary CEBus coupler 72, all three phases of a three-phase load center may be readily tied together, for purpose of CEBus communication.

Although CEBus communication has been disclosed, the invention is applicable to various other forms of communication involving power-line carrier signals, such as, for example, X-10.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalents thereof.

What is claimed is:

1. A coupler for a pair of power-lines, said coupler comprising:

a housing having a form of a circuit breaker;

means for electrically connecting to a neutral power-line;

a first circuit breaker stab disposed on said housing;

a second circuit breaker stab disposed on said housing;

means for coupling a power-line carrier signal as referenced to said neutral power-line between one of said first and second circuit breaker stabs, and the other of said first and second circuit breaker stabs; and wherein said power-line carrier signal has a carrier frequency; and wherein said means for coupling includes means tuned to said carrier frequency for inductively coupling said power-line carrier signal between said first and second circuit breaker stabs.

2. The coupler of claim 1 wherein said means tuned to said carrier frequency includes a capacitor.

* * * * *